Jan. 23, 1968  E. P. TOENNESEN  3,364,874
DRIVING MECHANISM FOR A VEHICLE
Filed Aug. 9, 1965  7 Sheets-Sheet 1
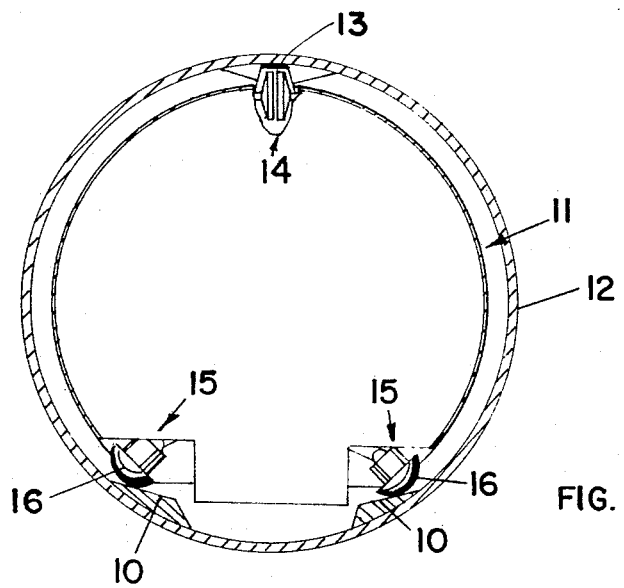
FIG. 1
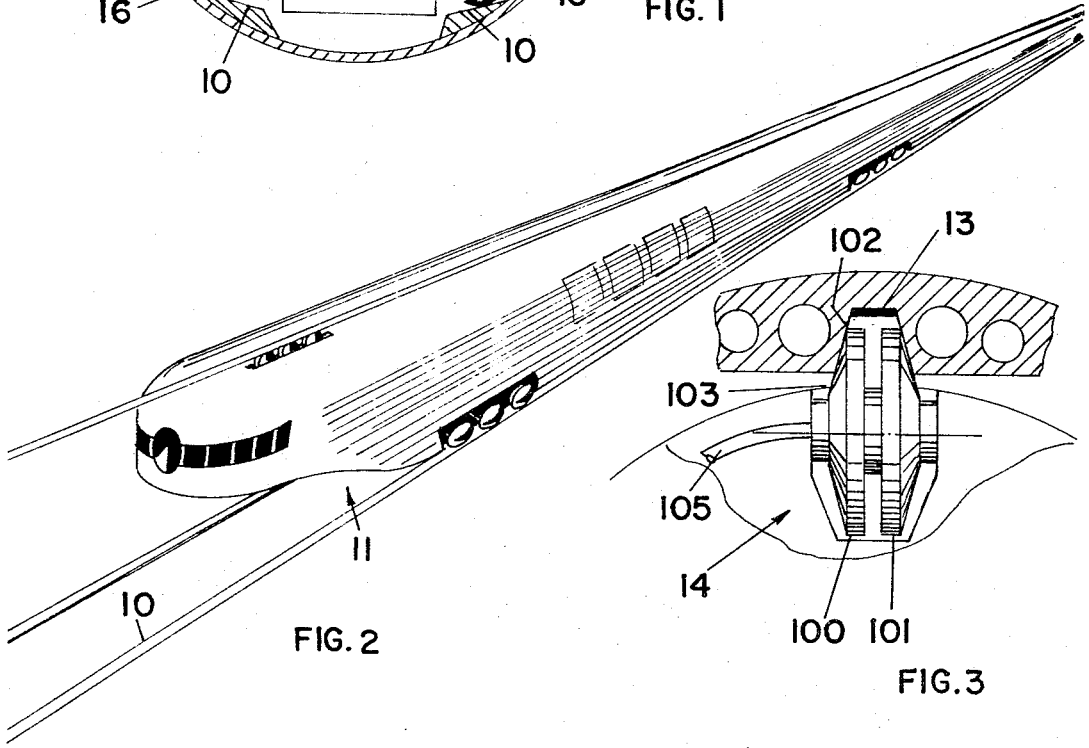
FIG. 2
FIG. 3
INVENTOR.
ERLING P. TOENNESEN
BY  Barlow & Barlow Jan. 23, 1968     E. P. TOENNESEN     3,364,874
DRIVING MECHANISM FOR A VEHICLE
Filed Aug. 9, 1965     7 Sheets-Sheet 3
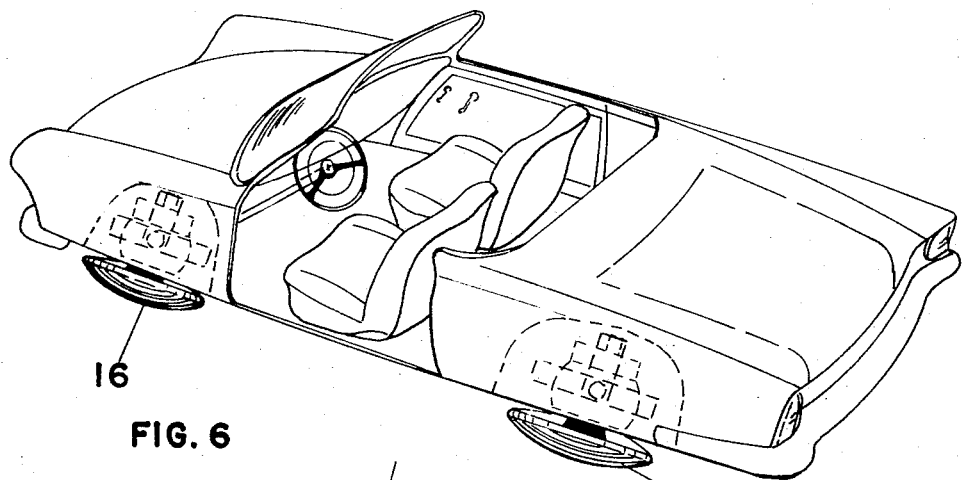
FIG. 6
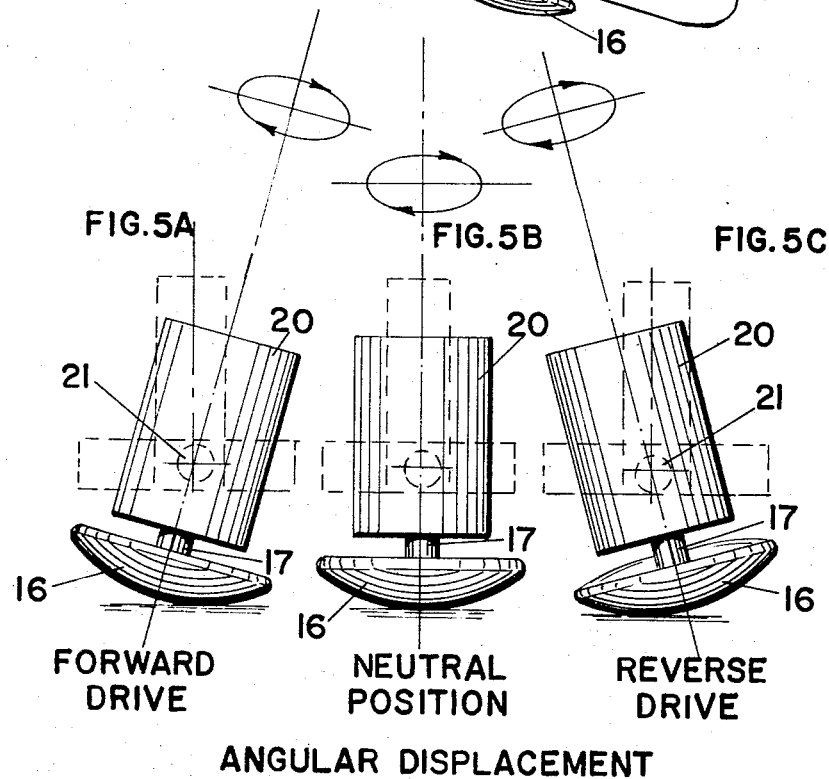
ANGULAR DISPLACEMENT Jan. 23, 1968  E. P. TOENNESEN  3,364,874
DRIVING MECHANISM FOR A VEHICLE
Filed Aug. 9, 1965  7 Sheets-Sheet 4
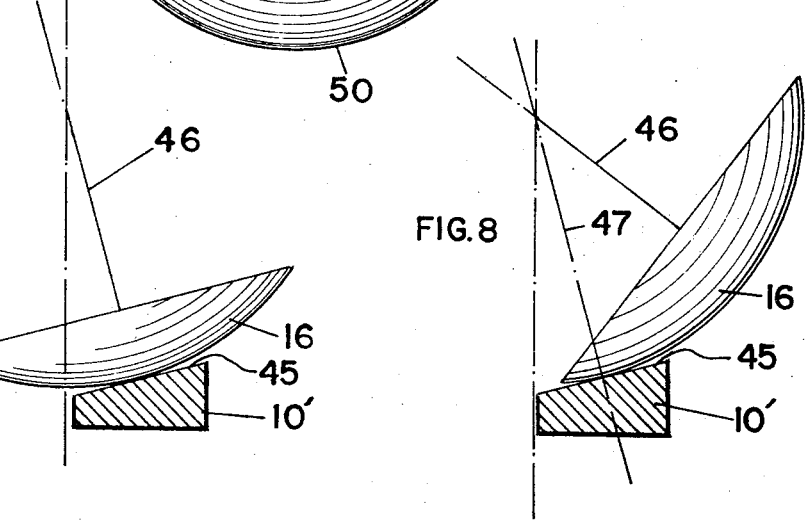
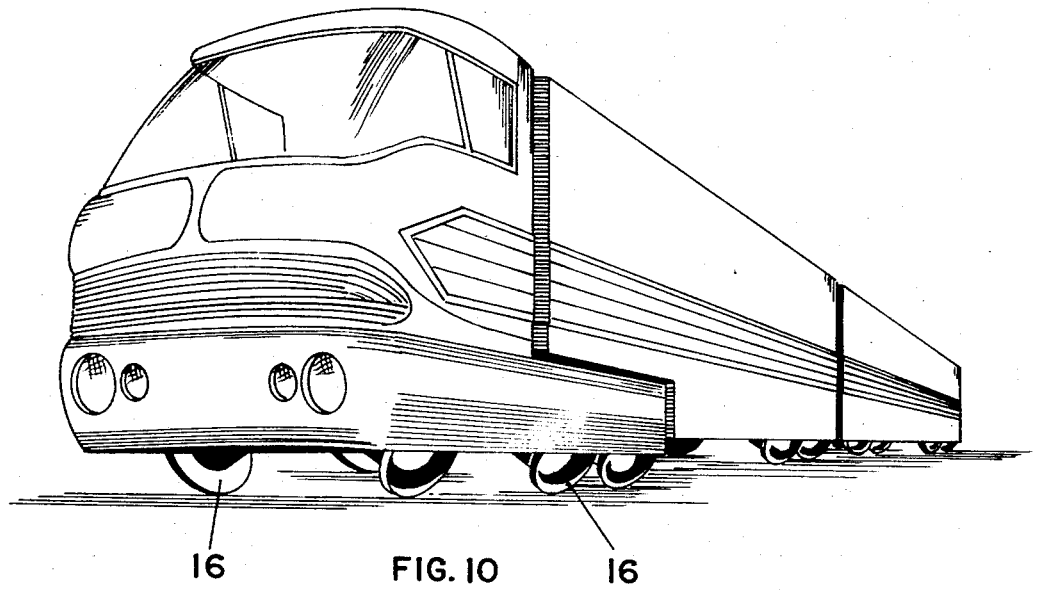

Jan. 23, 1968  E. P. TOENNESEN  3,364,874
DRIVING MECHANISM FOR A VEHICLE

Filed Aug. 9, 1965  7 Sheets-Sheet 5

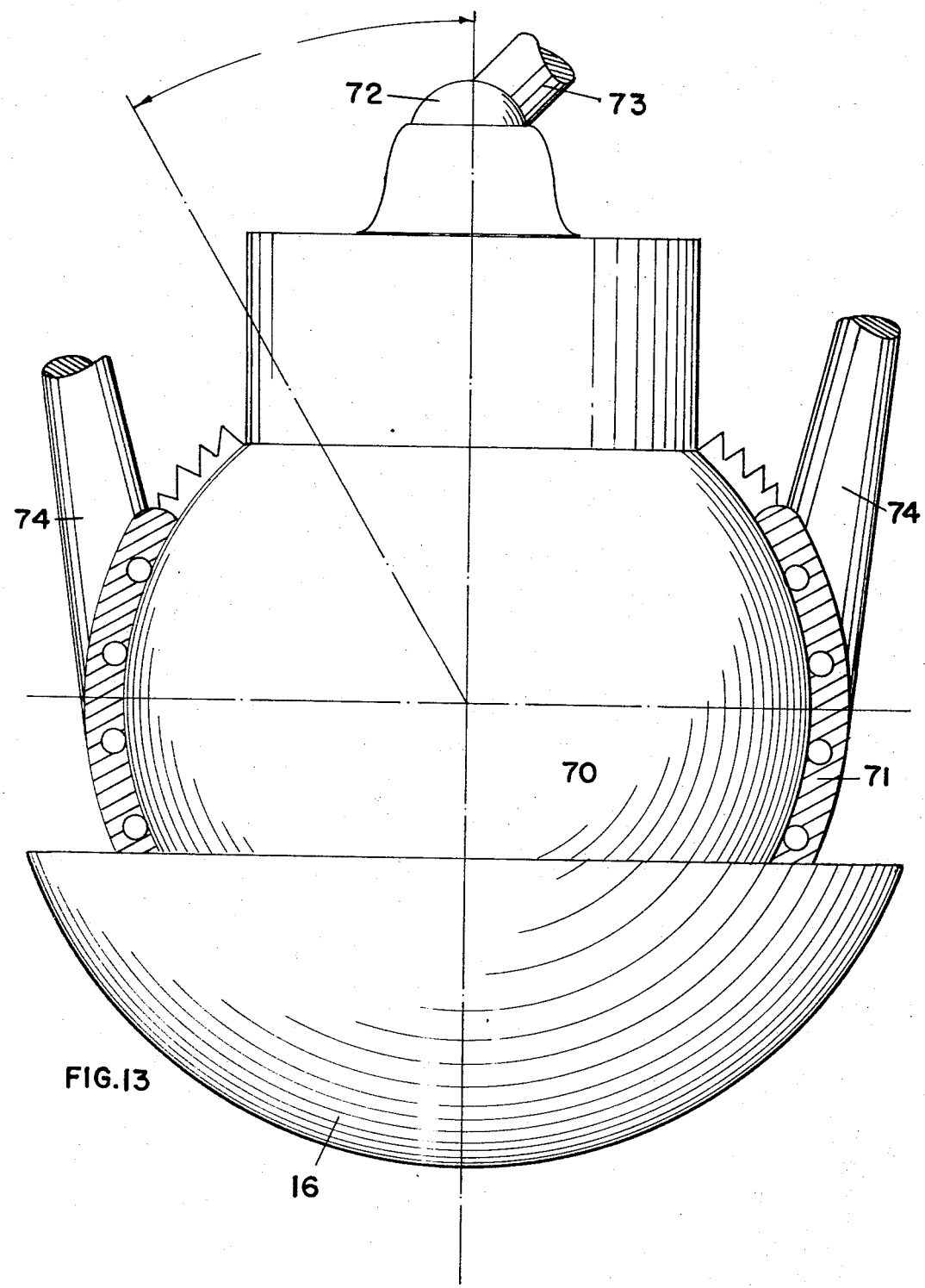

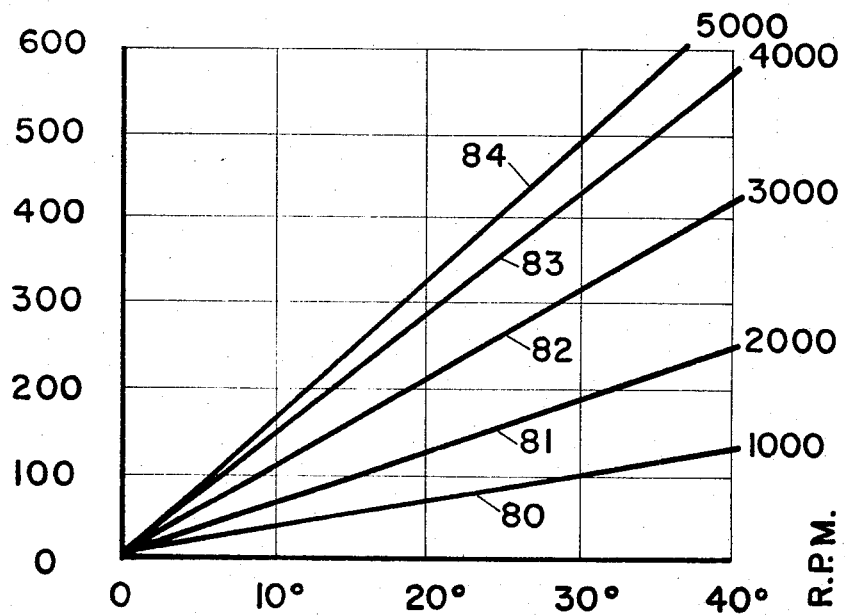
FIG. 14 HIGH SPEED VEHICLE
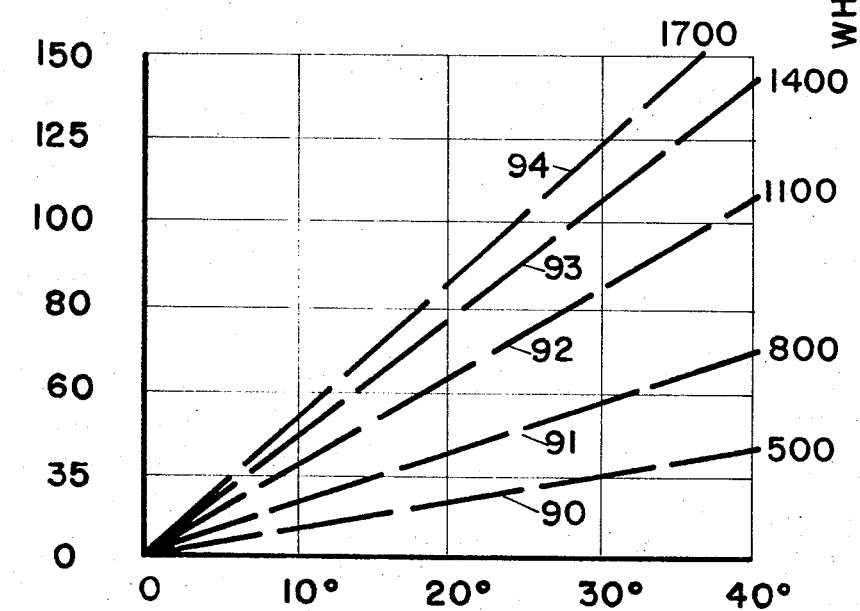
FIG. 15 LOW SPEED VEHICLE
ANGLE OF INCLINATION IN DEGREES

United States Patent Office 3,364,874
Patented Jan. 23, 1968

3,364,874
DRIVING MECHANISM FOR A VEHICLE
Erling P. Toennesen, Newport, R.I., assignor to Graphic Technology Syndicate, a partnership
Filed Aug. 9, 1965, Ser. No. 478,041
18 Claims. (Cl. 104—166)

ABSTRACT OF THE DISCLOSURE

A driving mechanism for any vehicle which is propelled on a surface such as a track or the ground, for example, a train or an automobile, comprising an axle which is rotated about its center axis in any convenient way with a member at the end of the axle having an arcuate surface conforming generally to a portion of a sphere with a means for positioning this surface at right angles to the surface of a track or the road with which it engages for a neutral position but tilting the axle so that some larger circumference at the point of contact than the point end of the neutral axis of the axle will engage the surface, thus tending to propel the vehicle by reason of this engagement with the surface. The arrangement is such that tilting in one direction will give movement in a forward direction while tilting in the opposite direction will give movement in the reverse direction while rotation about the axis of the axle will remain the same.

An object of the invention is to provide a means by which the speed of the vehicle may be controlled through the relative position of the axle to the supporting surface with which the wheel engages while maintaining either a constant or a varying speed of the axle and wheel.

Another object of the invention is to provide simplification of movements to a vehicle in different directions through the inclination of the axle.

Another object of the invention is to provide an arrangement so that very high speeds may be obtained.

Another object of the invention is to provide a means by which the momentum of the vehicle may be utilized for the generation of power which has been utilized to drive the vehicle in bringing it up to the speed which it has acquired, thus putting back some of the power which was used when the speed is decelerated.

Another object of the invention is to provide a braking means by using the rotating wheel as a drive against some retarding action or drag, although permitting that wheel to continue its rotation in the same direction.

With these and other objects in view, the invention consists of certain novel features of construction as will be more fully described and particularly pointed out in the appended claims.

In the accompanying drawings:

FIG. 1 is a sectional view through a tube or encircling frame in which the train is located showing the driving wheels in engagement with a track mounted in the tube or frame and the braking means also engageable with an overhead track with which it functions; the insides of the train are omitted;

FIG. 2 is a perspective view of the train equipped with the driving means of this invention and with the overhead braking means and track being only partially shown and the tube or frame omitted in order that the train may be viewed;

FIG. 3 is a fragmental sectional view on a larger scale showing in greater detail the braking mechanism;

FIGS. 5A, 5B and 5C illustrate the forward neutral and reverse driving positions of the wheel;

FIG. 6 is a perspective view partly broken away illustrating the driving means as mounted in an automobile;

FIG. 7 is a diagrammatic view illustrating the wheel in a neutral position on an inclined track;

FIG. 8 is a diagrammatic view illustrating the wheel as moved to a position for advanced driving contact with an inclined track surface upon which it is mounted;

FIG. 9 is an elevation of a modified shape of wheel;

FIG. 10 is a perspective view showing the driving means as mounted on a trailer type of truck;

FIG. 13 is a modified form of mounting to show a universal means of tilting the axis of the wheel axle; and FIGS. 14 and 15 are graphs showing the speed relationship at different velocities and inclinations of the wheel axle.

With reference to the drawings, 10 designates spaced tracks upon which a train designated generally 11 is designed to run. The train is designed to run in a tube or frame 12 which is provided with an overhead groove 13 into which there extends braking mechanism 14 carried by the train. This braking mechanism is shown in greater detail in FIG. 3 and will be later explained.

Figure 4:
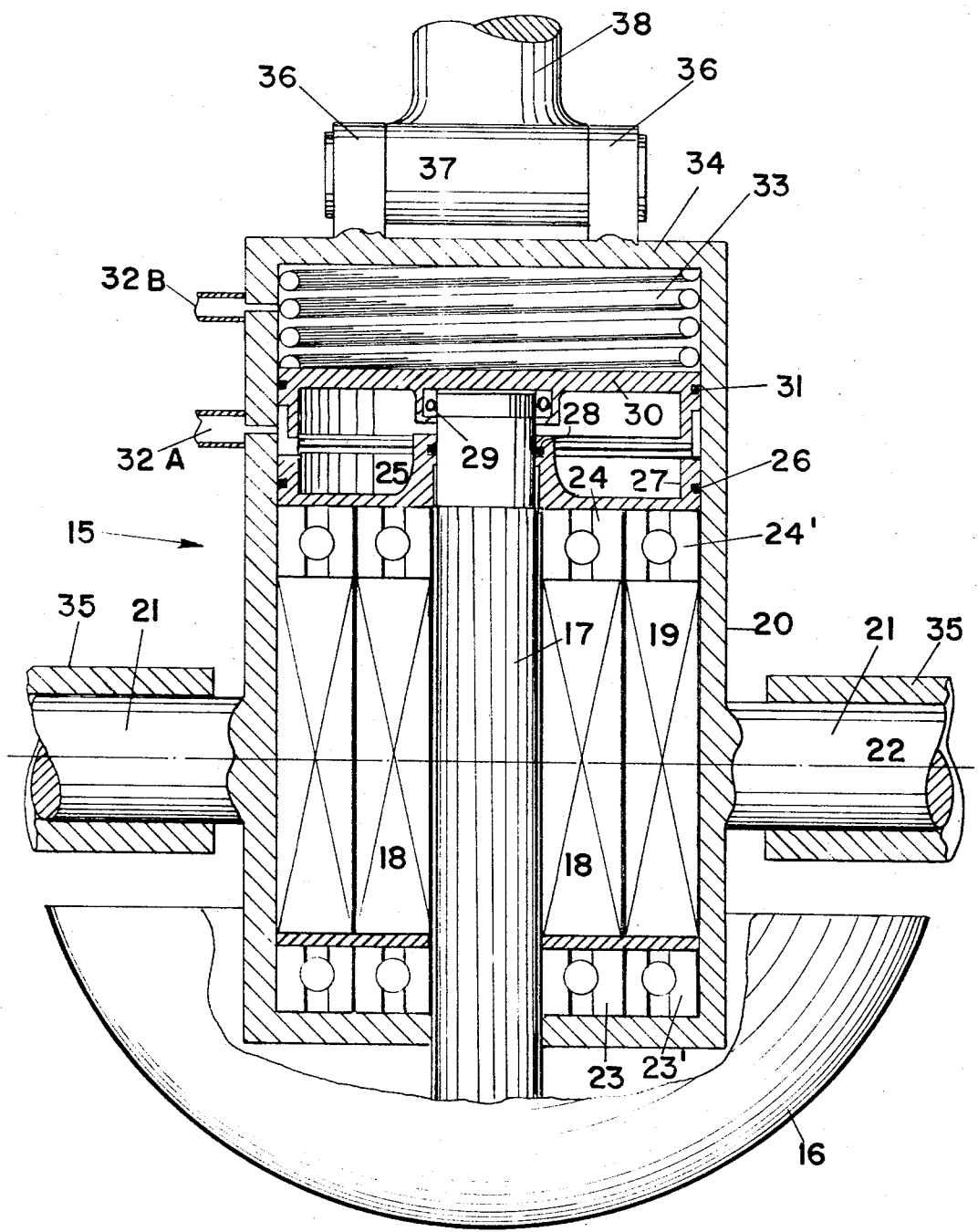
FIG. 4 is a sectional view with the wheel member broken away showing the driving means for the axle and the cushioning means for mounting the axle in the vehicle.

The train is to be propelled through a driving mechanism designated generally 15 and comprises members or wheels 16 which each have a surface conforming generally to a portion of a sphere. This mechanism is shown in greater detail in FIG. 4 to which reference will now be made. The wheel member is designated 16 and, as seen in FIG. 4, conforms to generally a portion of a sphere. The axle 17 joins a mid portion of this wheel member and is rotated by means of armature 18 splined on the axle 17 and a field 19 fixed in the cylindrical casing 20. This casing 20 is rockably mounted by trunnions 21 extending laterally from either side thereof so that the axis 22 of these trunnions may be a shorter distance to the supporting surface on which the wheel 16 engages than is the radius of the wheel 16. Ball bearings 23, 23' and 24, 24' are located at either end of the armature 18 supporting it in the cylindrical casing 20. These upper and lower bearings serve as rotary bearings for shaft 17. This shaft is smooth as at its upper end and is sealed by O-ring 28 to the collar of plate 25 which plate is sealed to the inner surface of the cylindrical casing 20 by an O-ring 26 in a suitable groove in the side wall 27 thereof. A thrust bearing 29 at the end of this shaft is located between shaft 17 and a companion plate 30 which is sealed to the inner surface of the cylinder 20 as by O-ring 31. Fluid pressure by any suitable means may be supplied between the plates 25 and 30 through the conduit 32A which would tend to force the plates apart and compress the spring 33 between the plate 30 and the top wall 34 of the cylinder 20 so as to lift the spherical wheel 16 away from the supporting surface while the vehicle is supported on other wheels. If, however, fluid pressure is applied above plate 30 and between it and the top wall 34 of the casing through conduit 32B the wheel will be forced downwardly and the fluid and spring will cushionably support the cylinder and in turn through the trunnions 21 and bearings 35 support the body of the vehicle or train thereon. It will be understood that a number of these wheels are provided in groups with as many as may be needed to properly support the weight of the train. In order to tilt the cylinder 20 and wheel 16 about the axis of the trunnions 21 ears 36 are secured to the top wall 34 of the casing mounting a portion 37 swivelly between them having an extension 38 therefrom so that either manually or mechanically the axle 17 may be tilted together with its wheel-like member 16 having the spherical surface.

The electric motor comprising the armature and field above described will rotate the member 16 and it may be assumed this will be rotated in the direction of the arrows shown in FIGS. 5A, 5B and 5C. Assuming the axle 17 to be at right angles to this wheel supporting surface which surface, as shown in FIG. 5B, is horizontal while the axle is shown as vertical by the dot dash line, there will be theoretically a point contact of the spherical surface with this flat surface on which the vehicle is supported. Therefore, regardless of the speed or number of revolutions per minute that the member 16 and its axle 17 is rotating, there will be no tendency for motion to be imparted to the vehicle. However, if the axle 17 is tilted as shown in FIG. 5A inclining the same to the right above the axis of the trunnions 21, then the contact which is made between the portion of the spherical surface of member 16 and the horizontal surface will be at one side of the axis of rotation of the axle 17 and therefore the member 16 acts as a driven wheel with the radius of the distance of the point of contact from the axis of rotation tending to move the vehicle to the left as seen in FIG. 5A which for convenience is designated as forward in this figure. Consequently, if all of the wheels on the left side of the vehicle are tilted inward above their pivot toward the center as shown in FIG. 5A, the vehicle will move forwardly. On the right side of the vehicle the rotation of the wheels would be in the opposite direction thus to obtain forward movement the tilting above the pivot point of the axle would also be inwardly.

If, however, with the same direction of rotation of the axle 17 the cylinder 20 its axle and wheel 18 are tilted about the trunnions 21 in the other direction to the inclination shown at FIG. 5C, movement of the vehicle would be in the reverse direction, and accordingly, if the wheels on the left side of the vehicle were tilted so that their axles tilted outwardly as shown in FIG. 5C, the vehicle would move in a reverse direction and this could be readily appreciated by viewing the automobile in FIG. 6 just above these figures. It will be appreciated that on the right side of the vehicle the rotation of the axles and wheels would be reversed; therefor, also the axles would be inclined outwardly on the right side for reverse movement of the vehicle.

It will also be apparent that if the axles are tilted for forward movement and it is desired to stop or slow down the vehicle, the axles may be moved to a neutral position when no power will be applied or may be moved to a reverse direction to give a positive frictioning on the surface which the wheels engage in the opposite direction to forward movement tending to slow down and stop the vehicle.

In FIGS. 7 and 8 the same general relationship is illustrated except that there is a track 10′ shown in these figures which has an angular surface 45 and the axis 46 of the axle is in the neutral position at right angles to the surface 45 for a neutral position, whereas it is at an angle to a line 47 perpendicular to the surface 45 in FIG. 8 for a driving position.

If it is desired that a greater traction be given to the wheel with the surface with which it engages, the spherical surface 50 as shown in FIG. 9 may be flattened out as at 51 so that instead of providing a line contact as rotation occurs there will be provided a broad band-like contacting surface. Thus, the amount of traction desired may be provided by shaping the surface which is to contact the track as occasion may require.

Figure 11:
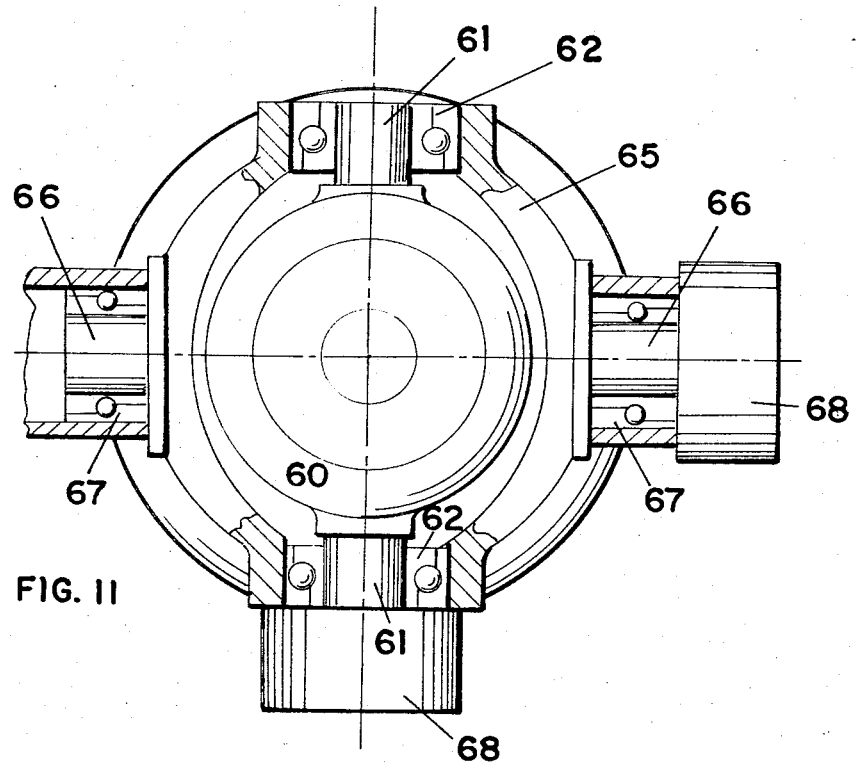
FIG. 11 is a plan view with parts broken away and in section showing a modified motor mounting.
Figure 12:
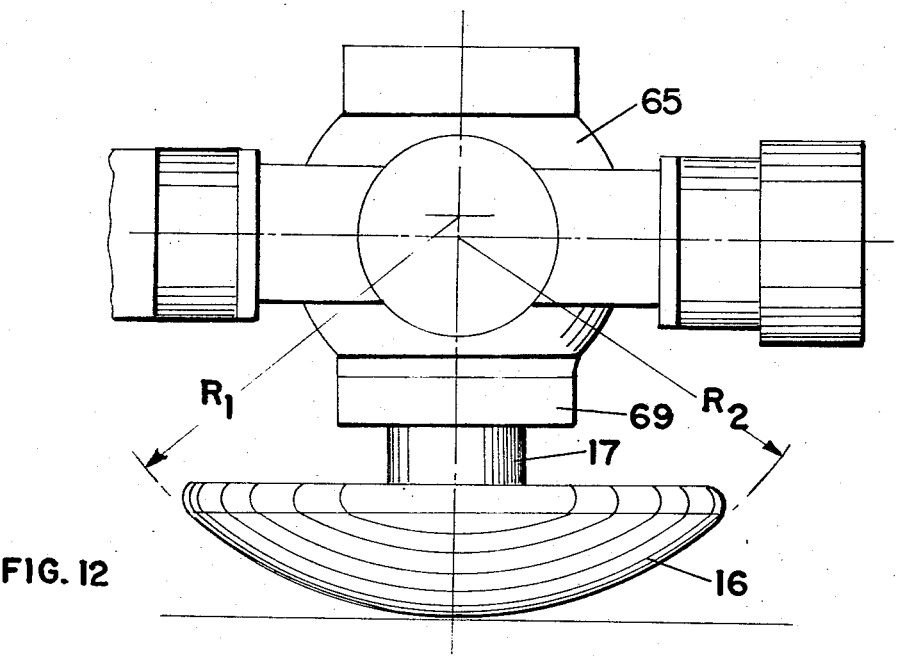
FIG. 12 is an elevation of the structure shown in FIG. 11.

In some cases the member 16 may be mounted as shown in FIGS. 11 and 12. Here the casing 60 is provided with trunnions 61 extending in diametrically opposite directions and mounted in ball bearings 62 in a second casing 65 which in turn is provided with trunnions 66 mounted in ball bearings 67 and extending diametrically in opposite directions at right angles to the axes of the trunnions 61 so that the member 16 and its axle 17 may be tilted by means of rotary actuators 68 and 69 in either one of two right-angular planes. A brake is incorporated in this structure designated 69 as shown in FIG. 12 which may be suitably actuated for bringing the rotation of the axle 17 to a stop. In this figure it will be noted that $R_2$ designates the radius of swing of the member 16 about its trunnions 66 while $R_1$ designates the radius of the spherical surface of the member 16 which is somewhat greater. By providing this difference in radius, there is a lift obtained depending in amount upon the difference between $R_1$ and $R_2$, and this lift effect makes it easy for the inclination to be obtained for varying the point of contact of the surface of the member 16 with the track.

In FIG. 13 the casing 70 in which the axle of the member 16 is mounted is spherical and is mounted in a support 71 having an inner complementary spherical surface so that the casing 70 with its axle and member 16 may be inclined in any direction or in any desired plane by means of the ball connection 72 and handle 73 which may be either manually or power-operated for swinging the casing 70. The shell 71 is supported to the body of the vehicle by means of struts 74.

In FIG. 14 there is plotted a graph for a high speed vehicle. Miles per hour are plotted vertically whereas degrees of inclination of the axle are plotted horizontally. The lower line 80 assumes a thousand revolutions per minute. Thus at a 30-degree inclination a speed of 100 miles per hour may be obtained. The next line 81 assumes a speed of 2000 revolutions per minute, and it will be noted that at a 30-degree inclination nearly 200 miles per hour may be expected. In the next line 82 assuming 3000 revolutions per minute at 30 degrees inclination, an excess of 300 miles per hour may be provided. In line 83 with 4000 revolutions per minute about 420 miles an hour would be provided, whereas line 84 with a speed of 5000 revolutions per minute with a 30-degree inclination shows 500 miles per hour, any of which might be suitable for a train moving through a casing such as shown in FIG. 1.

In the graph shown in FIG. 15 a different number of revolutions per minute of the axle is illustrated, and in the lower line 90 assuming 500 revolutions per minute if the axle is tilted 30°, we would obtain 35 miles an hour, from line 91 at 800 r.p.m. we would get about 60 miles an hour, from line 92 at 1100 r.p.m. we would get an excess of 80 miles per hour, while from line 93 at 1400 r.p.m. would give out 120 miles an hour and from line 94 at 1700 r.p.m. would give about 125 miles per hour.

These graphs are assuming a member having a radius of a sphere of 36 inches in FIG. 14 while in FIG. 15 the assumption is for a member 16 having a radius of a sphere of substantially 25 inches.

In FIG. 3 there is illustrated a pair of discs 100 and 101 which are so connected that they may slide toward each other away from surfaces 102 which are complemental to the outer surfaces 103 of the discs. If it is desired to provide a braking action, these discs may be moved apart by pressure supplied through tube 105 to the interior of the assembly which will expand the discs 100 and 101 so that they will forcibly engage the surfaces 102 of the groove 13 into which they extend and thus apply a retarding action on the train. As many of these discs as desired for the proper action may be supplied along the upper edge of the train to engage the groove in the tube 12.

From the above it will be apparent that a vehicle may be moved forward or reverse by opposite inclinations of the driving axle or if the vehicle is desired to be moved sidewise or in any direction this may be provided by the appropriate inclination of the driving axles of the wheels where a structure such as shown in FIGS. 11, 12 and 13 is provided.

I claim:
1. A driving mechanism for a vehicle comprising a casing, an axle, means mounting said axle in said casing, a member fixed to an end of said axle and having a surface conforming generally to a portion of a sphere and generally symmetrical with the axis of said axle for engaging a surface for relative movement with respect thereto, motor means within said casing for rotating said axle, means to move said casing from a position with said axle at right angles to said engaged surface to an incline to said surface for relative movement of said mounting with respect to said engaged surface.

2. The mechanism of claim 1 wherein said casing may be inclined in a plane to either side of a perpendicular to said surface for relative movement of said mounting and said engaged surface in opposite directions.

3. The mechanism of claim 1 wherein said casing may be inclined in a plurality of planes to either side of a perpendicular to said engaged surface for relative movement of said mounting and said engaged surface in opposite directions.

4. The mechanism of claim 1 wherein said casing is mounted on a vehicle on axes at right angles to each other and to said axle to move with reference to said engaged surface.

5. The mechanism of claim 1 wherein the engaged surface is inclined to the horizontal and the casing is in vertical position for relative movement thereto.

6. The mechanism of claim 4 wherein the casing contains resilient means between the axle and the vehicle support of the casing when the casing is in a generally vertical attitude.

7. The mechanism of claim 1 wherein said surface is in a single plane and said axle casing is on a vehicle to move with reference to said engaged surface.

8. The mechanism of claim 7 wherein said casing may be inclined in a plane perpendicular to said engaged surface to either side of a perpendicular to said engaged surface for relative movement of said vehicle over said engaged surface in opposite directions.

9. The mechanism of claim 7 wherein said axle may be inclined in a plurality of planes perpendicular to said surface to either side of a perpendicular to said surface for relative movement of said vehicle over said engaged surface in a plurality of opposite directions.

10. The mechanism of claim 7 wherein said engaged surface is a track and the surface of said member bears thereon and supports said vehicle and serves to drive the same along said track.

11. The mechanism of claim 10 wherein the surfaces of the tracks are oppositely inclined.

12. The mechanism of claim 10 wherein the surfaces of the tracks are oppositely inclined downwardly toward each other.

13. In combination a track having spaced surfaces inclined to a horizontal, a vehicle for movement over said track comprising a drive mechanism having axles, each axle having a member fixed to the end of said axle with a surface conforming generally to the surface of a portion of a sphere and generally symmetrical with the axis of said axle, said members engaging said spaced inclined surfaces with said axle vertical for driving the vehicle along said track.

14. The combination of claim 13 wherein said spaced surfaces are inclined downwardly toward each other.

15. The combination of claim 13 wherein said means for rotating said axle is an electrical motor which may serve as a brake if driven by the momentum of the vehicle for assisting the stopping of the vehicle.

16. The combination of claim 13 wherein said means for rotating said axle is a hydraulic motor which may serve as a brake if driven by the momentum of the vehicle for assisting the stopping of the vehicle.

17. A driving mechanism for a vehicle comprising an axle, a mounting therefor, a member fixed to an end of said axle and having a surface conforming generally to a portion of a sphere with a flat band along a portion of its surface at right angles to the radius of the sphere and generally symmetrical with the axis of said axle for engaging a surface for relative movement with respect thereto, motor means for rotating said axle, means to move said axle from a position at right angles to said engaged surface to an incline to said engaged surface for relative movement of said mounting with respect to said engaged surface.

18. A driving mechanism for a vehicle comprising an axle, a mounting therefor, a member fixed to an end of said axle and having a surface conforming generally to a portion of a sphere and generally symmetrical with the axis of said axle for engaging a surface for relative movement with respect thereto, motor means for rotating said axle, and means to pivot said axle from a position at right angles to said engaged surface to an incline to said engaged surface for relative movement of said mounting for said axle with respect to said engaged surface, said radius of the spherical surface being greater than the distance of said pivot from the engaged surface.

References Cited

UNITED STATES PATENTS

| 402,934 | 5/1889 | Judson | 104—166 |
| 2,488,310 | 11/1949 | Mayer | 180—7 |
| 3,251,430 | 5/1966 | Veryzer | 180—7 |

FOREIGN PATENTS

| 512,471 | 7/1952 | Belgium. |
| 514,711 | 11/1920 | France. |

ARTHUR L. LA POINT, *Primary Examiner.*

D. F. WORTH, *Assistant Examiner.*